United States Patent [19]
Silverbrook

[11] Patent Number: 5,861,961
[45] Date of Patent: Jan. 19, 1999

[54] INTEGRATED GRAPHICS SYSTEM FOR A COLOR COPIER

[75] Inventor: Kia Silverbrook, Woollahra, Australia

[73] Assignees: Canon Kabushiki Kaisha, Tokyo, Japan; Canon Information Systems Research Australia Pty Limited, New South Wales, Australia

[21] Appl. No.: 53,362

[22] Filed: Apr. 28, 1993

[30] Foreign Application Priority Data

Apr. 29, 1992 [AU] Australia .................................. PL2155

[51] Int. Cl.$^6$ .............................. H04N 1/387; H04N 1/21
[52] U.S. Cl. .......................... 358/450; 358/452; 358/296
[58] Field of Search .................................. 358/450, 537, 358/452, 296; 355/202

[56] References Cited

U.S. PATENT DOCUMENTS

| | | | |
|---|---|---|---|
| 4,214,276 | 7/1980 | Pugsley et al. .......................... | 358/450 |
| 4,322,157 | 3/1982 | Miura et al. ............................. | 355/202 |
| 4,591,904 | 5/1986 | Urabe et al. ............................. | 358/537 |
| 4,641,197 | 2/1987 | Miyagi ..................................... | 358/452 |
| 4,655,577 | 4/1987 | Ikuta ........................................ | 355/202 |
| 5,091,746 | 2/1992 | Watanabe ................................ | 355/202 |
| 5,115,273 | 5/1992 | Ujiie et al. ............................ | 355/202 X |
| 5,181,162 | 1/1993 | Smith et al. ............................. | 364/419 |
| 5,198,865 | 3/1993 | Haneda et al. ....................... | 355/202 X |
| 5,271,065 | 12/1993 | Rourke et al. ....................... | 358/450 X |
| 5,278,611 | 1/1994 | Ito et al. .................................. | 355/202 |
| 5,371,609 | 12/1994 | Suzuki et al. ........................... | 358/448 |
| 5,396,345 | 3/1995 | Motoyama .............................. | 358/448 |
| 5,495,561 | 2/1996 | Holt ........................................ | 395/114 |

*Primary Examiner*—Randy W. Gibson
*Attorney, Agent, or Firm*—Fitzpatrick, Cella, Harper & Scinto

[57] ABSTRACT

An image processing apparatus for creating a color image by combining object image data with scanned image data includes a scanner for inputting image data and object image input device for inputting object image data. Host processor selects object image data from the input object image data and specifies parameters for editing the selected object image data to create edited object image data. Real-time processor edits the selected object image data according to the parameters specified by the host processor and combines the edited object imaged data with the scanned image data to create combined image data. An output device outputs the combined imaged data to form an image representing a combination of the scanned image data and the object image data.

22 Claims, 2 Drawing Sheets

INTEGRATED GRAPHICS SYSTEM FOR A COLOR COPIER

BACKGROUND

1. Field of the Invention

The present invention relates to colour copying and in particular, discloses a graphics system specifically adapted for inclusion into a colour copier.

2. Description of the Related Art

Colour composition systems for creating full colour desk top publishing seems capable of creating and printing, say, A3 size full colour images at 400 dots per inch (dpi), traditionally use a personal computer system with the aid of various input devices such as a mouse and a keyboard. The image is normally composed and stored in a frame buffer memory device on a pixel by pixel basis before the image is written out to the relevant display device, such as a colour printer on a line by line basis. Additionally, portions of the image can be scanned in by various scanning devices and also written to the frame buffer, thereby becoming part of the final image.

For an image the size of an A3 page, at 400 dpi, 4,632× 6,480 pixels must be stored. If 24-bits of colour are stored per pixel, this gives a total storage requirement of over 90 Mbytes. Such a storage size requirement is significant expense in the design of a full colour composition system in addition to resulting in an increase in the size of any system incorporating the composition system. The cost and size of a colour copier is thereby increased should it be desired to incorporate an image composition system into a colour copier.

SUMMARY OF THE INVENTION

It is an object of the present invention to provide a simplified image composition system for integration with a printing device that substantially eliminates the need for storage of an image on a pixel by pixel basis.

In accordance with the present invention there is disclosed colour copier comprising scanning means for inputting scanned image data, an input for object based image data, host processor means connected to said input for selecting object based image data and editing same to create edited object image data, real-time processor means connected to said host processor means for combining said edited image data with said scanned image data to output a combined image signal, and printing means for printing an image defined from said combined image signal.

BRIEF DESCRIPTION OF THE DRAWINGS

A preferred embodiment of the present invention will now be described with reference to the drawings in which.

DETAILED DESCRIPTION OF THE PREFERRED EMBODIMENT

The present invention is specific application of technology disclosed in U.S. patent application Ser. No. 08/053, 373, filed Apr. 28, 1993, claiming priority from Australian Patent Application No. PL2147, filed Apr. 29, 1992, entitled "A Real-Time Object Based Graphics System"; U.S. patent application Ser. No. 08/053,212, filed Apr. 28, 1993, claiming priority from Australian Patent Application No. PL2148, filed Apr. 29, 1992, entitled "Method and Apparatus for Filling an Object Based Rasterised Image"; U.S. patent application Ser. No. 08/053,214, filed Apr. 28, 1993, claiming priority from Australian Patent Application No. PL2153, filed Apr. 29, 1992, entitled "Method and Apparatus for Providing Transparency in an Object Based Rasterised Image"; U.S. patent application Ser. No. 08/053,365, filed Apr. 28, 1993, claiming priority from Australian Patent Application No. PL2156, filed Apr. 29, 1992, entitled "Edge Calculation for Graphics Systems" and Australian Patent Application No. PL2145, filed Apr. 29, 1992, entitled "Object Sorting for Graphics Systems"; U.S. Patent Application Ser. No. 08/053,378, filed Apr. 28, 1993, claiming priority from Australian Patent Application No. PL2142, filed Apr. 29, 1992, entitled "A Preprocessing Pipeline for RTO Graphics System"; U.S. patent application Ser. No. 08/053,219, filed Apr. 28, 1993, claiming priority from Australian Patent Application No. PL2150, filed Apr. 29, 1992, entitled "Object Based Graphics Using Quadratic Polynomial Fragments"; and U.S. patent application Ser. No. 08/053,213, filed Apr. 28, 1993, claiming priority from Australian Patent Application No. PL2149, filed Apr. 29, 1992, entitled "Bezier Spline to Quadratic Polynomial Fragment Conversion," all lodged by the present applicant, the disclosure of each of which is hereby incorporated by reference.

The preferred embodiment of the present invention relates to hardware that is additional to and works in combination with, components existing in colour laser copiers.

Figure 1:
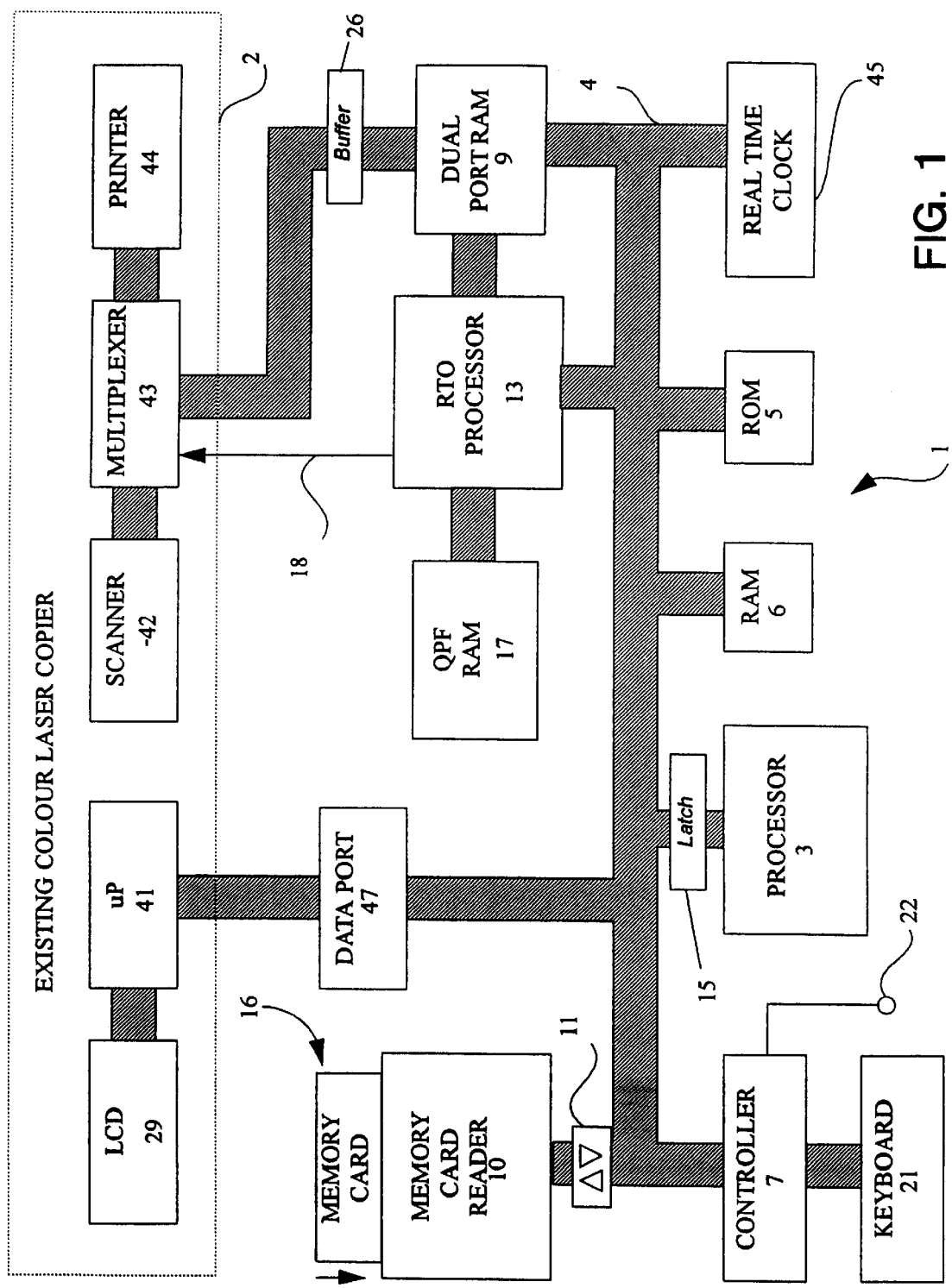
FIG. 1 is a schematic block diagram of the preferred embodiment.
Figure 2:
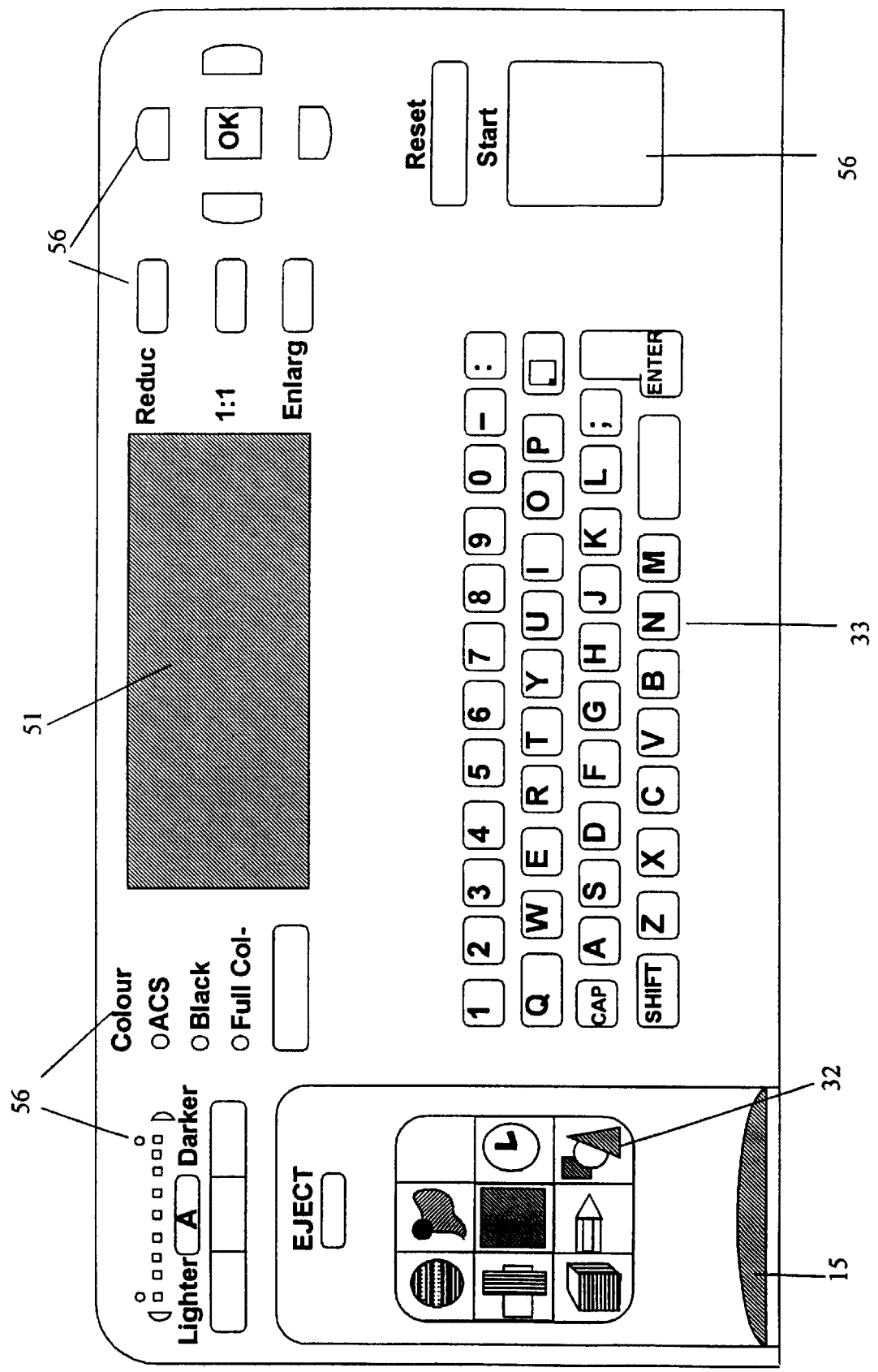
FIG. 2 illustrates the panel control functions of FIG. 1.

Referring to FIG. 1, an integrated presentation graphics colour copier system 1 is shown which includes the existing circuitry 2 of a colour laser copier. The existing circuitry 2 used in the system 1 specifically is an LCD display 29, a microprocessor 41, a scanner 42, a multiplexer 43, and a printer 44. Such features are available in known colour copiers such as the Canon Colour Laser Copier CLC500, produced by Canon K. K. of Japan.

The integrated presentation graphics colour copier system 1 also includes a host processor 3 connected to a processor bus 4 via an address latch 15. Also connected to the processor bus 4 are a system ROM 5, a system RAM 6, a serial controller 7, a data port 47, a real time clock 45, an RTO processor 13, a memory card reader 10 with its associated buffer 11, and a dual port RAM 9.

The host processor 3 is a general purpose microprocessor which is arranged to control the generation of object based images. In the preferred embodiment, the host processor 3 is a 32 bit microprocessor such as the INTEL i960SA, which permits high speed operation at low cost and has a wide addressing range. The host processor 3 operates to create and maintain multiple object lists which are stored in the system RAM 6 and which include multiple objects which are ultimately processed by the RTO processor 13 to form an image. The calculations for image generation are generally only performed at the graphics object level. For each image that is to be created, the host processor 3 specifies the position, size, and colour of each object that is to appear in the final image. The host processor 3 also interacts with the serial controller 7 to a keyboard 21 which allows the user to interface with the integrated presentation graphics colour copier system 1 for command and control, including the selection of graphic objects to form an image for printing. The serial controller 7 interprets keyboard commands from the keyboard 21 and forwards the keyboard commands to the host processor 3 via the processor bus 4. Additionally, the host processor 3 can be configured to take over many of the standard operating tasks of the copier.

Alternatively, the microprocessor 41 included in the copier can be used in place of the host processor 3, provided it can process data at a sufficient speed, generally around 5 MIPs or more and, is capable of being programmed in a high level language such as C. Such an alternative is not initially attractive, as it complicates software development and subsequent maintenance.

A real-time clock 45 is also provided whereby printed pages can be either ordered in a time queue, or stamped with the time of printing, or both.

The host processor 3 has a 16-bit external data bus which is multiplexed with a 32-bit address bus. In addition, there are 16 control signals provided by the host processor 3. The most significant 16 address bits (bits 31–16) are not multiplexed. However address bits 15–4 are demultiplexed by address latch 15. The host processor 3 has secondary control of the processor bus 4, while the RTO processor 13 can obtain access to the bus 4 via DMA whenever it requires such access, except whenever specifically locked out via software controlling the host processor 3. The address latch 15 is of a tri-state nature and is only used when the host processor 3 has control of the bus 4. The address bits 3,2,1 are demultiplexed directly by the host processor 3 to avoid any latch delays during burst accesses. During bursts, the upper address bits and the latched address bits remain static, while address bits 3–1 count up. Thus, host processor bursts are limited to 16 bytes. These bursts can occur in several combinations of byte and half-word accesses. All address decoding is based on the upper 4 address lines (aligned to 256 Mbyte boundaries), so one host processor burst cannot span multiple devices.

The multiplexed data bus of the host processor 3 is used to directly control the RTO processor 13, system RAM 6, system ROM 5, serial controller 7 and the memory card reader 10.

Arbitration of the processor bus 4 takes place between the host processor 3 and RTO processor 13. The host processor 3 masters the bus 4 until RTO processor 13 is commanded (by the host processor 3) to begin operation. RTO processor 13 then takes control of the processor bus 4 and will notify the host processor 3 when it is finished. The host processor 3 has no mechanism to stop RTO processor 13 from obtaining the processor bus 4 except by halting the RTO processor 13 from operation. The RTO processor 13 will attempt to completely prepare an object list for printing or display once started and can use the processor bus 4 continuously once it gets it (if the RTO processor 13 is rendering at the same time, it may bottleneck internally and release the processor bus 4 until it is able use it again). Multiple object lists can be used to make up an image, and hence the system software can use this approach to prevent the RTO processor 13 from holding too long a mastership of the processor bus 4.

The host processor 3 communicates with the various other devices of the integrated presentation graphics colour copier system 1 by means of memory mapped I/O. The upper 4 bits of the processor bus 4 are decoded by PALs (programmable array logic(s) not shown) to provide all necessary enable and select signals, read and write strobes, buffer controls and the ready signal for the host processor 3. This logic is active when the host processor 3 masters the bus 4 and when RTO processor 13 masters the bus 4.

The integrated presentation graphics colour copier system 1 interfaces with the existing circuitry 2 via a data port 47 and a data buffer 46 which respectively interconnect to the microprocessor 41 and to the multiplexor 43.

The system ROM 5 contains 512 kilobytes of ROM which is generally provided by a single 256K×16 device. The system ROM 5 contains the controlling program for the integrated presentation graphics colour copier system 1 as well as various examples of images, fonts, clip titles, and other data used in the integrated presentation graphics colour copier system 1. Both the host processor 3 and RTO processor 13 can access the memory in the system ROM 5, and single and burst accesses are supported. Preferably, the system ROM 5 is wired so that larger ROMs can be used when they become readily available.

The system RAM 6 contains 256K bytes of RAM which consist of two 128K×8 devices. The system RAM 6 is used by the host processor 3 for the caching of graphics objects including QPF lists, the caching of performance critical code, and as a variable storage. Single and burst accesses are supported, as are byte writes. Preferably, the system RAM 6 is also wired so that larger RAMs can be used when they become readily available.

The memory card interface reader 10 provides for the insertion of standardized memory cards. Typically, this reader is adapted to take cards conforming to both the JEIDA and PCMIA standards. JEIDA (Japanese Electronics Industry Development Association) and PCMCIA (PC Memory Card International Organization) have released substantially identical standards for the use of 68 pin interchangeable memory cards. Each memory cards 16 can be typically be used as ROM devices incorporating object graphic data, but can also be either flash EPROM or static Ram with battery backup. Each memory card 16 is used to store libraries of graphics objects, object edit lists, clip titles, fonts, characters, animation sequences and/or special programs which can be used to replace or supplement all or part of the programs within system ROM 5. Where static RAM cards are used, these can also be used for storage of a user's images for later use. Preferably, the memory card interface socket 8 is capable of accommodating cards with increased storage capabilities as they become available.

In operation, the user inserts a memory card 16 and selects an appropriate graphics image via the keyboard 21. Once an appropriate template is selected, the user can then type in a message and/or edit the image as required and then manipulate the printing of an image using standard colour copier functions. This includes printing the image whereby the printed page is provided within a number of seconds. Accordingly, the production time of full colour printed images can be substantially reduced and depends only upon the provision of a wide range of graphics object images on a variety of memory cards 16.

The memory cards 16 are devised by professional animators and pre-programmed for purchase directly by users. The user is then able to print images whereby text can be added at any location in the image.

Because of the limitations of the memory cards 16, it is not possible to provide photographic images for templates. However, photographic images can be manipulated using the scanner 42 whereby a photograph can be reduced in size and included in an image supplemented with text inserted by the user.

The memory reader 10 to the memory cards is preferably buffered by the buffer 11 from all other devices accessing the processor bus 4. This is to ensure that the memory cards do not interfere with the logic levels of the processor bus 4 at any stage. Since a memory card 16 can be inserted or removed by the user at any time, some bus problems may be unavoidable. Short pins in the memory card interface socket 8 can be used to provide interrupts a short time before the card is removed. If the RTO processor 13 is mastering the processor bus 4 when a card is removed, the recovery time for the host processor 3 software will be reduced by the maximum bus tenure of the RTO processor 13. The memory card reader 10 is provided with short card detect pins which generate insertion and removal interrupts for the indication of the presence or otherwise of a memory card 16. The signals are sent to the serial controller 7 where they can be used for detection of removal or insertion of crooked memory cards. The detected memory card signal can then be relayed to the host processor 3 through a general interrupt. This allows notification of a software event to update the current state of the host processor 3 to take account of the removal or insertion.

In order to determine the nature of the memory card 16 inserted, an optional attribute memory can be read from the memory card 16. This attribute memory is only 8 bits wide, is read on the low data bus, and is accessed at the predetermined memory address of the memory card. This allows the integrated presentation graphics colour copier system 1 to be used in conjunction with memory cards of different attributes and speeds. Preferably, system software is provided to interrogate the memory cards and decide, based on their speed and optional attribute memory, how the RTO processor 13 and the host processor 3 will best be able to safely access the memory cards.

Where SRAM-type memory card devices with battery backups are supported, the memory card reader 10 is provided with battery condition signals that are connected to the serial controller 7 and indicate whether the battery is good or bad.

The serial controller 7 is preferably implemented by a Exar 82C684 Quart device which includes four, full duplex, asynchronous serial channels, two timers and sixteen general purpose input and output ports. The connection of the serial controller 7 to processor bus 4 is only 8 bits wide, so all accesses only exist on the lower (even) byte of the processor bus 4. A first serial communications link 22 is used to communicate with the keyboard 21 for the interactive entry and control by the user entering requests, commands, selections and information. A second serial communications link 23 (not shown) can be connected to the controller 7 to provide a touch panel, sensitive to a user's input and adapted to determine the location of the input. The second serial communications link 23 (not shown) can be used to provide a dial control means to receive directional inputs from the user of the graphics system.

The RTO processor 13 is set up and controlled by the host processor 3 for the real-time rendering of object based graphic image. A full description of a specific example of the RTO processor 13 can be found in U.S. patent application Ser. No. 08/053,373, filed Apr. 18, 1993, claiming priority from Australian Patent Application No. PL2147, filed Apr. 29, 1992 by the same applicant, the disclosure of which is again incorporated by cross-reference.

The RTO processor 13, apart from interfacing with the processor bus 4, also interfaces with its own dedicated QPF memory 17, which is implemented as 512k bytes of 25 ns local QPF memory (four 128K×8 rams). These rams are always enabled, and RTO processor 13 drives the read and write strobes directly.

Once setup and started, the RTO processor 13 reads lists of objects from the system ROM 5, the system RAM 6, or the memory card into its own local memory, prepares the objects, and then renders the objects, outputting an 8-bit data word in the form of RTO processor output level bus 18, for each pixel of the output device, which describes the level and effects desired for the highest visible object active at the pixel. Preferably, the display lists include object outline data which permit the calculation of graphic images in real time. An example of such data is quadratic polynomial fragments (QPF) which are normally cached in the system RAM 6, but can be read directly from the system ROM 5 or from memory card 16.

After reading the display list in the form of QPF's, the RTO processor 13 scales and translates the QPF objects in each of the X and Y directions. This allows the implementation of squash and stretch effects, as well as the compensation for different pixel aspect ratios found on different output devices.

Next, QPF's which have been translated or scaled so as to now be entirely off the screen are removed from the object list by culling. QPF's which are too small to be visible, are also culled. QPF's which cross the boundaries of the output device are also clipped. After initial processing, the QPF's are stored in the dedicated QPF memory 17. Once all the QPF's are stored in the dedicated QPF memory 17, they are sorted into line order and then pixel order in terms of the position of each of the first pixel in each QPF. Subsequently, the intersections of all QPF's with scan lines that they cross are calculated. This is performed in real-time without the use of a frame store. QPF's are not flattened into straight lines before intersection calculation, and accordingly curvature is preserved in the curves even at high magnification. After intersection calculation, the visible ordering of objects is determined and hidden surfaces are removed. Regions of colour are then filled by extending the priority levels for each QPF until the next intersection. Transparency and effect calculations are then performed in hardware and at real-time data rates. In this manner, the RTO processor 13 outputs pixel data for display on raster displays or printing on a copier device in a synchronous manner and comprises colour level data which is transferred via the 8-bit level RTO processor output level bus 18.

When RTO processor 13 is a slave to the host processor 3, the host processor 3 is able to read the control registers of the RTO processor 13 in addition to reading the dedicated QPF memory 17. Access to control registers of the RTO processor 13 is performed by memory mapped I/O techniques. The base address for accessing the dedicated QPF memory 17 is programmed into RTO processor 13 registers at start-up and is also set according to the host processor memory map table. The RTO processor 13 does not support burst access or byte writes to its registers or dedicated QPF memory 17.

When the RTO processor 13 is in control of the processor bus 4, the RTO processor 13 drives the demultiplexed address and data buses directly. As mentioned previously, it requests use of the processor bus 4 by notification and subsequent grant from the host processor 3.

The RTO processor 13 has an interrupt out signal which is connected to and forms the host processor 3 highest priority interrupt (INTO). This interrupt can be used to indicate many events including completion of operations and internal error events.

The 8-bit contents of the RTO processor output level bus 18 is used to form the address of a dual port RAM 9 which is used as a colour palette between the RTO processor 13 and Canon CLC 500 copier 25. Preferably, the dual port RAM 9 is divided into a number of separate palette areas, with a separate palette area being chosen after a predetermined number of lines have been printed by the Canon CLC 500 copier 25. The Canon CLC 500 copier 25 operates by means of a four-pass process. The four colour passes include Cyan, Magenta, Yellow and Black (CMYK). Hence, swapping of palette areas can be timed to occur at the completion of each colour pass of the Canon CLC 500 copier 25. One port of the dual port RAM 9 outputs the colour selected by the RTO processor 13 to a copier interface buffer 26.

This 8-bit contents of the RTO processor output level bus 18 determines which object is on top for each section of a scan line. The object priorities are output at a resolution of 4,632 pixels per line, corresponding to 400 dots per inch on an A3 page. This information is then passed to the dual port RAM 9, which assigns a colour to each object level. This colour can be any of the colours that the colour laser copier is capable of printing.

In an alternative embodiment the dual port RAM 9 can be replaced by a colour processing unit such as that disclosed in U.S. patent application Ser. No. 08/053,231, filed Apr. 28, 1993 by the present applicant and entitled "A Colour Generation and Mixing Device", the disclosure of which is incorporated herewith.

The copier interface buffer 26 outputs the current pixel colour in addition to pixel clocking information, copier enablement signals and line enable signals from the RTO processor 13 to the Canon CLC 500 copier 25 according to its specific timing requirements. The other port of the dual port RAM 9 is connected to the processor bus 4. This port is readable and writable and will permit burst accesses by the host processor 3 and can be used by the host processor 3 to alter the colour palette area by software control. Hence, the colour palettes can by changed at any time by the host processor 3, including between the time that the Canon CLC 500 copier 25 is engaged in a colour pass, or even when the Canon CLC 500 copier 25 is engaged in a current colour pass.

This output from the copier interface buffer 26 can then be incorporated into the copier data stream via the multiplexer 43 under the control of the RTO processor 13 and printed as if it were data directly from the scanner 42. Hence, the final image can be made up of portions of a scanned in image and other portions made up of graphic objects created by the integrated presentation graphics colour copier system 1. Images are generated in real-time directly as magenta, cyan, yellow and black (MCYK) data at the video rate used internally by the colour copier, generally about 13.33 Megabits per second. Alternative embodiments can be adapted for use in four drum printers whereby the MCYK data is required to be calculated simultaneously. For compatibility with existing colour laser copiers, such as the Canon CLC500 and CLC200, the integrated presentation graphics colour copier system 1 is adapted to produce colour pages at 400 dots per inch (dpi) using object based graphics and fonts.

The foregoing describes only some embodiments of the present invention particular to specific output devices. Use of other models and modifications, obvious to those skilled in the art, can be made thereto without departing from the scope of the invention.

We claim:

1. An image processing apparatus for creating a color image by combining object-based graphic image data with scanned pixel-based image data, comprising:

scanning means for inputting pixel-based scanned image data;

object image input means for inputting object-based graphic image data, said object-based graphic image data comprising a graphical representation of an image component including outline data and color data, host processor means for selecting object-based graphic image data from the input object-based graphic image data and for specifying parameters for editing the selected object-based graphic image data to create edited object-based graphic image data;

real-time processor means for editing the selected object-based graphic image data according to the parameters specified by the host processor means, for rendering said edited object-based graphic image data into pixel-based rendered image data in real-time, and for creating combined image data by combining the pixel-based rendered image data with the pixel-based scanned image data in real-time; and output means for outputting the combined image data to form an image representing a combination of the pixel-based scanned image data and the object-based graphic image data;

wherein said real-time processor means renders in real-time and also in substantial synchronism with output by said output means.

2. An image processing apparatus according to claim 1, wherein said real-time processor means comprises real-time object processor means for rendering the edited object-based graphic image data, and color transformation means for receiving the rendered object-based graphic image data and determining colors therefor based on a color palette.

3. An image processing apparatus according to claim 1, wherein the edited object-based graphic image data is comprised of quadratic polynomial fragments.

4. An image processing apparatus according to claim 3, wherein the edited object-based graphic image data comprises only a portion of the image which is to be outputted by said image processing apparatus.

5. An image processing apparatus according to claim 1, wherein said object image input means comprises a memory storage housing means for receiving a detachable memory storage device containing object-based graphic image data.

6. An image processing apparatus according to claim 5, wherein said detachable memory storage device is a non-volatile memory card.

7. An image processing apparatus according to claim 5, wherein said detachable memory storage device stores a system code used to operate said image processing apparatus.

8. An image processing apparatus according to claim 5, wherein said object image input means further comprises detection means for detecting the presence of said detachable memory storage device.

9. An image processing apparatus according to claim 1, further comprising a touch panel for inputting object-based graphic image data, which is sensitive to a user's touch, and which transmits the location of the object-based graphic image input data to said host processor means.

10. An image processing apparatus according to claim 1, further comprising dial control means for inputting object-based graphic image data into said image processing apparatus.

11. An image processing apparatus according to claim 1, further comprising a timer means for outputting a timing value based on which said real-time processor means renders in real-time.

12. An image processing apparatus for creating a color image by combining object-based graphic image data with scanned pixel-based image data, comprising:

scanning means for inputting pixel-based scanned image data;

object image input means for inputting object-based graphic image data, said object-based graphic image data comprising a graphical representation of an image component including outline data and color data;

host processor means for selecting object-based graphic image data from the input object-based graphic image data and for specifying parameters, including said object outline data, for editing the selected object-based graphic image data to create edited object-based graphic image data;

real-time processor means for editing the selected object-based graphic image data according to the parameters specified by the host processor means, for rendering said edited object-based graphic image data into pixel-based rendered image data, and for creating combined image data by combining the pixel-based rendered image data with the pixel-based scanned image data; and output means for outputting the combined image data to form an image representing a combination of the pixel-based scanned image data and the object-based graphic image data;

wherein said real-time processor means renders in real-time and also in substantial synchronism with output by said output means.

13. An image processing apparatus according to claim 12, wherein said real-time processor means comprises real-time object processor means for rendering the edited object-based graphic image data, and color transformation means for receiving the rendered object-based graphic image data and determining colors therefor based on a color palette.

14. An image processing apparatus according to claim 12, wherein the edited object-based graphic image data is comprised of quadratic polynomial fragments.

15. An image processing apparatus according to claim 14, wherein the edited object-based graphic image data comprises only a portion of the image which is to be outputted by said image processing apparatus.

16. An image processing apparatus according to claim 12, wherein said object image input means comprises a memory storage housing means for receiving a detachable memory storage device containing object-based graphic image data.

17. An image processing apparatus according to claim 16, wherein said detachable member storage device is a non-volatile memory card.

18. An image processing apparatus according to claim 16, wherein said detachable memory storage device stores a system code used to operate said image processing apparatus.

19. An image processing apparatus according to claim 16, wherein said object image input means further comprises detection means for detecting the presence of said detachable memory storage device.

20. An image processing apparatus according to claim 12, further comprising a touch panel for inputting object-based graphic image data, which is sensitive to a user's touch, and which transmits the location of the object-based graphic image input data to said host processor means.

21. An image processing apparatus according to claim 12, further comprising dial control means for inputting object-based graphic image data into said image processing apparatus.

22. An image processing apparatus according to claim 12, further comprising a timer means for outputting a timing value based on which said real-time processor means renders in real-time.

* * * * *